(12) United States Patent
Munro Simpson et al.

(10) Patent No.: US 11,995,773 B2
(45) Date of Patent: May 28, 2024

(54) COMPUTER IMPLEMENTED METHOD AND SYSTEM FOR NAVIGATION AND DISPLAY OF 3D IMAGE DATA

(71) Applicants: Guy's and St. Thomas' NHS Foundation Trust, London Greater London (GB); King's College London, London Greater London (GB)

(72) Inventors: John Munro Simpson, London Greater London (GB); Kuberan Pushparajah, London Greater London (GB); Alberto Gómez Herrero, London Greater London (GB); Julia Anne Schnabel, London Greater London (GB); Gavin Wheeler, London Greater London (GB); Shujie Deng, London Greater London (GB); Nicolas Toussaint, London Greater London (GB)

(73) Assignees: King's College London, London Greater London (GB); Guy's and St. Thomas' NHS Foundation Trust, London Greater London (GB)

( * ) Notice: Subject to any disclaimer, the term of this patent is extended or adjusted under 35 U.S.C. 154(b) by 92 days.

(21) Appl. No.: 17/763,728

(22) PCT Filed: Sep. 25, 2020

(86) PCT No.: PCT/GB2020/052337
§ 371 (c)(1),
(2) Date: Mar. 25, 2022

(87) PCT Pub. No.: WO2021/058981
PCT Pub. Date: Apr. 1, 2021

(65) Prior Publication Data
US 2022/0343605 A1    Oct. 27, 2022

(30) Foreign Application Priority Data

Sep. 25, 2019    (GB) .................................... 1913832

(51) Int. Cl.
*G06T 19/00*    (2011.01)
*G06F 3/04815*    (2022.01)
(Continued)

(52) U.S. Cl.
CPC ........ *G06T 19/003* (2013.01); *G06F 3/04815* (2013.01); *G06F 3/04845* (2013.01); *G06T 19/20* (2013.01); *G06T 2219/2024* (2013.01)

(58) Field of Classification Search
CPC ... G06T 19/003; G06T 19/20; G06F 3/04815; G06F 3/04845
(Continued)

(56) References Cited

U.S. PATENT DOCUMENTS

| | | | | |
|---|---|---|---|---|
| 2001/0055016 A1* | 12/2001 | Krishnan | ................ | G06T 15/08 345/424 |
| 2011/0262023 A1* | 10/2011 | Brabec | ...................... | G06T 5/20 382/128 |

(Continued)

OTHER PUBLICATIONS

International Search Report in corresponding PCT/GB2020/052337 dated Dec. 3, 2020.

*Primary Examiner* — Prabodh M Dharia
(74) *Attorney, Agent, or Firm* — LEASON ELLIS LLP

(57) ABSTRACT

A computer-implemented method and system for navigation and display of 3D image data is described. In the method, a 3D image dataset to be displayed is retrieved and a highlight position is identified within the 3D image dataset. A scalar opacity map is calculated for the 3D image dataset, the opacity map having a value for each of a plurality of positions in the 3D image dataset, the respective value being dependent on the respective position relative to the highlight (Continued)

position, and on the value of the 3D image at the respective position relative to the value of the 3D image at the highlight position. The opacity is applied to the 3D image dataset to generate a modified 3D image view.

13 Claims, 3 Drawing Sheets

(51) Int. Cl.
　　*G06F 3/04845*　　(2022.01)
　　*G06T 19/20*　　(2011.01)
(58) Field of Classification Search
　　USPC .................. 345/418, 424; 600/443; 382/128
　　See application file for complete search history.

(56) References Cited

U.S. PATENT DOCUMENTS

| | | | |
|---|---|---|---|
| 2014/0187948 A1* | 7/2014 | Gerard | A61B 8/469 600/443 |
| 2019/0099159 A1* | 4/2019 | Voigt | A61B 8/466 |
| 2019/0110198 A1* | 4/2019 | LeCun | H04N 19/52 |
| 2020/0184640 A1* | 6/2020 | Mahadik | G06T 1/20 |

* cited by examiner

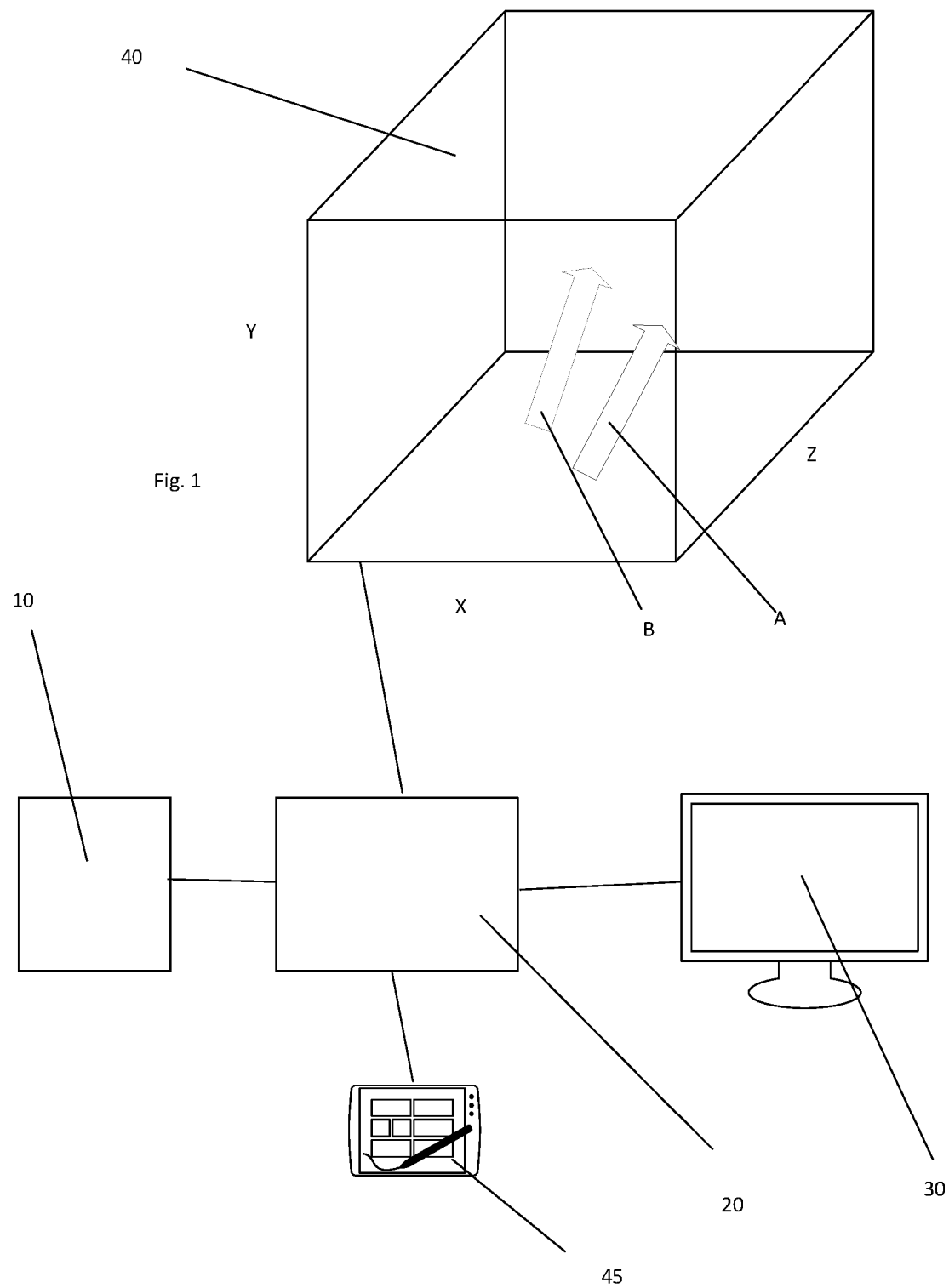

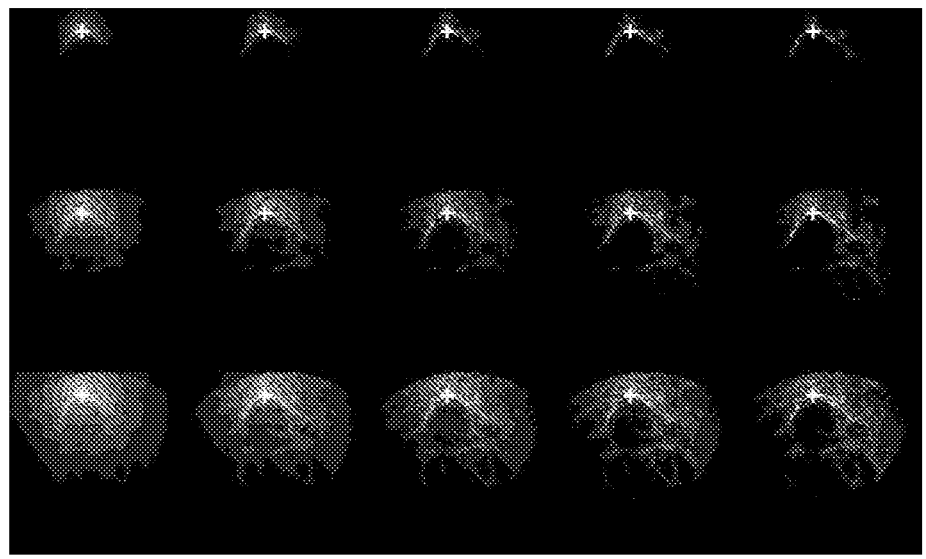
Fig. 4.
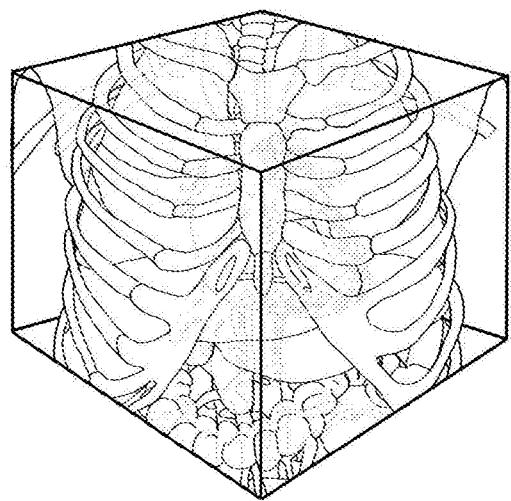
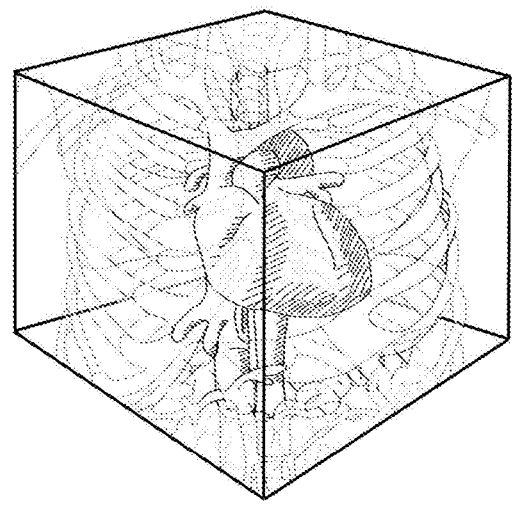
Fig. 2a                          Fig. 2b

COMPUTER IMPLEMENTED METHOD AND SYSTEM FOR NAVIGATION AND DISPLAY OF 3D IMAGE DATA

CROSS-REFERENCE TO RELATED APPLICATIONS

This application is a U.S. National Stage Application under 35 U.S.C. § 371 of International Patent Application No. PCT/GB2020/052337, filed Sep. 25, 2020, which claims priority to Great Britain Patent Application No. 1913832.0, filed Sep. 25, 2019, the contents of which are each hereby incorporated by reference in their respective entireties.

FIELD OF THE INVENTION

The present invention relates to a system and computer implemented method for navigation and display of three-dimensional imaging and is particularly applicable to three-dimensional imaging of the human anatomy for the purpose of medical diagnosis and treatment planning.

BACKGROUND TO THE INVENTION

Conventional imaging scanners are used for various purposes including imaging human and animal bodies for diagnosis and guidance during medical intervention such as surgery. Other uses for imaging scanners include structural analysis of buildings, pipes and the like.

A conventional medical ultrasound scanner creates two-dimensional B-mode images of tissue in which the brightness of a pixel is based on the intensity of the echo return. Other types of imaging scanners can capture blood flow, motion of tissue over time, the location of blood, the presence of specific molecules, the stiffness of tissue, or the anatomy of a three-dimensional (3D) region.

Traditionally, imaging scanners produce 2D images. 2D images such as 2D ultrasound images cannot represent three-dimensional structures typical of human or animal body organs because they can only capture one 2D slice of a cross-section. However, if a probe such as an ultrasound probe is mechanically or electronically swept over an area of interest, a three-dimensional image volume is generated. Alternatively, some ultrasound probes, for example "matrix" probes, have multiple piezo-electric crystals and can construct "real-time" 3D ultrasound images. This can then be displayed by, for example, 3D holographic technologies, and the anatomy becomes much easier to visualize for both the trained and untrained observer as it is more representative of the true underlying structure/anatomy. Other technologies also allow the capture or building of 3D imagery.

3D imaging (in the form of ultrasound, CT, MR) has become available to clinicians in recent years and has proved extremely valuable due to the ability to convey imaging information in an intuitive format. In the field of cardiology, for example, such data is being used to plan and guide surgical and catheter interventions.

A current limitation of 3D imaging is that although the data is 3D in its nature, conventional 2D displays can only render a flat representation (projection, slice, casting, etc) of the image on a screen.

3D imaging devices are available as indicated above. However, most computing systems (including those in imaging systems) have two dimensional displays and also user interface designs for two dimensional navigation. It is only recently that technology has been made available to display 3D images using computed reality technology such as holograms, virtual reality, mixed reality or augmented reality technology. Such technologies have, however, not been primarily developed for the specific requirements of a clinical setting. 3D systems tend to be expensive and their interfaces alien to users used to working in 2D.

A further issue with three dimensional rendering of data is that the volume of information portrayed to the user increases substantially.

While this can be argued to be positive, it also makes navigation and changing of views in the three dimensional space and assimilating information on a feature of interest more difficult.

Often these issues mean that the user drops back to working on two-dimensional slices of the 3D image data using a 2D display and user interface. While this may be preferred by users, it loses information from the three-dimensional view that may be of relevance or interest to the user (for example from a different orientation). As a result, many of the advantages of the 3D system are lost and the 3D system ends up becoming an expensive 2D system.

STATEMENT OF INVENTION

According to an aspect of the present invention, there is provided a method and apparatus for navigation and display of 3D image data. The method comprises:
   retrieving a 3D image dataset to be displayed;
   receiving identification of a highlight position within the 3D image dataset;
   calculating a scalar opacity map for the 3D image dataset, the opacity map having a value for each of a plurality of positions in the 3D image dataset, the respective value being dependent on the respective position relative to the highlight position, and on the value of the 3D image at the respective position relative to the value of the 3D image at the highlight position; and,
   applying the opacity to the 3D image dataset to generate a modified 3D image view.

In embodiments of the present invention, a 3D image dataset refers to a 3D array of scalar or vector values, and possibly an associated extent, orientation and resolution that allows to establish a correspondence between the 3D image and real or imaginary world objects. The methods and apparatus described here, and the outlined claims, apply to this definition of 3D image data, but also to other definitions including, but not restricted to, non-Cartesian spatial sampling of a 3D scalar or vector field, such as 3D spherical sampling (for example used in some 3D ultrasound systems), 3D unstructured datasets (for example resulting from computational fluid dynamics simulations) and point clouds (for example from particle image velocimetry). In all cases, the value of a point within the 3D image may be a colour value or some other scalar or vector image related value. The value may or may not have been captured by an image sensor—it could be ultrasound, MRI, doppler or other data but it could also represent velocity of blood that has been detected or other modalities or measurable/computable values that map to the 3D image.

In the case of multi-channel 3d image data, a number of different approached could be taken (which may be available for selection by a user interface or may have been pre-selected depending on expected data). For example:
   The system may apply the same opacity mask to multiple ones (not necessarily all) of the channels. The opacity mask may have been calculated for one channel, calculated for the multiple channels and merged or calculated for a flattened version of the channels.

The system may selectively (by system or user) calculate and apply an opacity mask to just one channel;

e.g. for colour flow Doppler the anatomy channel (B-Mode) could be made to fade out, but the blood flow (CFD channel) does not fade out The system may apply an opacity mask to multiple channels in a weighted manner (determined by the system or specified by the suer via a user interface)

e.g. for colour flow Doppler the anatomy channel (B-Mode) could be made to fade out more, compared to the fading out of blood flow (CFD channel) which fades out less—fading out compared at the same distance from the highlight point Or the fading out distance may be different to one channel from the other, e.g. anatomy fades out quite close to the highlight point, colour flow further away from the highlight point The step of calculating may comprise using a masking kernel. As an alternative to a masking kernel, a pre-defined shape or another 3D image may be used as a masking function.

The modified 3D image view may be rendered as a 2D or 3D image (or other rendering) for display to the user.

Preferably, the scalar opacity map is calculated for a region of the 3D image dataset, the region comprising the portion of the 3D image dataset between the highlight position and the edges of the 3D image dataset in a field of view.

One example of such 3D images is 3D ultrasound images of the heart. These include lots of structures surrounding the heart that are opaque to ultrasound; as a result, these structures will occlude the view of the internal heart structures. An example of this can be seen in FIG. 2a). Embodiments of the present invention include a method and system that gives the user the ability to peel away obscuring structure and focus on structure(s) of interest. Preferred embodiments have an intuitive user interface that uses the centre of view from a designated highlight position in the 3D imaged volume to define the structure of interest. In this way, the user simply needs to identify where they wish to highlight from and in which direction (in a similar manner to shining a torch on an unlit scene) and the system is able to focus on structures in that field of view. Preferably, a masking kernel is used (or the user may be given the ability to select from one of a number of masking kernels) and the user interface include user interface features via which parameters of the kernel are tuneable by the user. The parameters are preferably tuneable during use so that the user can change the degree to which surrounding structures can be seen.

One type of kernel that may be used is the Gaussian kernel discussed below. Alternatively, it will be appreciated that other kernels such as those based on a uniform/rectangular distribution, a radial basis function, a spherical step function or an exponential distribution (in the case of an exponential distribution the user would select a point/area to obscure rather than one to highlight.)

Preferred embodiments apply a position-dependent opacity kernel such that the opacity of image features in a rendered 2D view (or 3D view) of a 3D image dataset is changed depending on position of the highlight point. Preferably, the user interface enables a user to move the highlight point and optionally other parameters used to control the opacity as are described in more detail below. Advantageously, the user is provided with an intuitive user interface to navigate a 3D image using a 2D display. Preferably, the user interface takes inputs from a keyboard and/or mouse and/or other controller that interact with the user interface via the 2D display. In this manner, the user can change perspective/view around the 3D image and view the highlighted structure/area form different perspectives. As a 3D image defines by voxels or the like, the volume can be navigated and viewed using existing 3D rendering systems (or 2D slices or other rendering of the 3D image).

Although the focus of the following discussion is on 3D imagery, it will be appreciated that embodiments of the present invention are applicable to higher dimension datasets such as 4D (3D imagery+time), for example. In such a case, the user interface may include the capability for the user to set a point (or range) in time to be displayed or it may automatically loop through recorded imagery for the view.

Similarly, the dimensions need not correspond (or correspond entirely) to data from the visible spectrum and could include representations of ultrasound, MRI (Magnetic Resonance Imaging) or other data that is used to form multi or hyperspectral images to be viewed.

For example:

3D Colour Doppler Data

This modality consists of 3-channel, 3D imaging data over time. Each time-frame is a volume of data, and for each voxel in the imaging data there are two values (channels): a background value corresponding to the B-Mode (brightness) anatomical image, normally visualized in grayscale; and a Doppler velocity value, which measures, typically in cm/s, the blood velocity along a specific direction, and is typically visualized in red-to-blue colour scale.

Diffusion MRI Data

This modality consists of N-channel, 3D imaging data ($N>0$). Each voxel in the imaging data contains $N+1$ values. The first value is called the BO signal, and all following values correspond to diffusion-weighted signals at the voxel location. N is typically 6, but can be up to several hundred channels. This type of modality is often utilised for exploring the intrinsic tissue orientation within an organ.

PET-MRI Data

This modality is produced by dedicated MRI scanners that are equipped with a PET imaging device. It consists of 2-channel, 3D imaging data. Each voxel in the imaging data contains 2 values. The first value corresponds to the MR-weighting signal (it can be T1-, T2-weighted, or any other MR modality), and the second one corresponds to the PET signal. This type of imaging modality is often used to highlight the concentrated presence of radio tracers that attach to tumour tissue, superimposed to the structural MRI signal.

MR (or CT)—Ultrasound Fusion

Not a modality per se, but (normally live) 3D or 2D ultrasound data may be fused with MR or CT data. This may provide a structural/functional view or to show features in one modality which may not be as clear in the other. This may be used for guidance. The two sets of data could be kept in separate coordinate systems or fused into a single volume where one modality is registered to the other and then resampled.

It will be appreciated that calculation of the masking kernel, opacity channel and 2D or 3D rendered image may be done on the fly or may be cached/recorded—particularly in the case of a looped (in time) display, it may be preferable to generate the rendered image during the first loop and cache those until the position or kernel parameters are moved. It will furthermore be appreciated that embodiments of the present invention are also applicable for use in live image capture situations. The user interface may be used in place of the view a technician uses to guide the probe when scanning a patient or as an alternate view for the clinician that can be controlled independently of the operation of the probe.

Embodiments of the present invention are able to work in substantially real-time, allowing the user to navigate the imaged volume and change what is and is not being displayed simply by moving the highlight position and kernel parameters.

In contrast to existing systems that involve slicing planes through the volume and then manually cropping images, it will be appreciated that embodiments of the present invention provide significant power and flexibility while at the same time reducing the specialist knowledge and skills needed to operate the imaging system.

Preferred embodiments make use of full 3D interaction to allow the user to pick a location in 3D (for example by hand tracking, or with an interaction tool) and make structures fade out as they get far from this point.

It will be appreciated that user interactions can be recorded for later replay (and the recording needs only record view points and parameters for reproduction as the views themselves can be re-calculated at time of display—particularly if different display devices are to be used to render the 3D image dataset, this approach is particularly advantageous as different clinicians or specialists may have different display technologies available to them).

BRIEF DESCRIPTION OF THE DRAWINGS

Embodiments of the present invention will now be described, by way of example only, with reference to the accompanying description in which:

FIG. 1 is a schematic diagram of an imaging system according to an embodiment of the present invention;

FIGS. 2a and 2b are illustrative line drawings and corresponding images showing a 3D rendered image without (FIG. 2a) and with (FIG. 2b) processing according to an embodiment of the present invention;

DETAILED DESCRIPTION

Figure 3A:
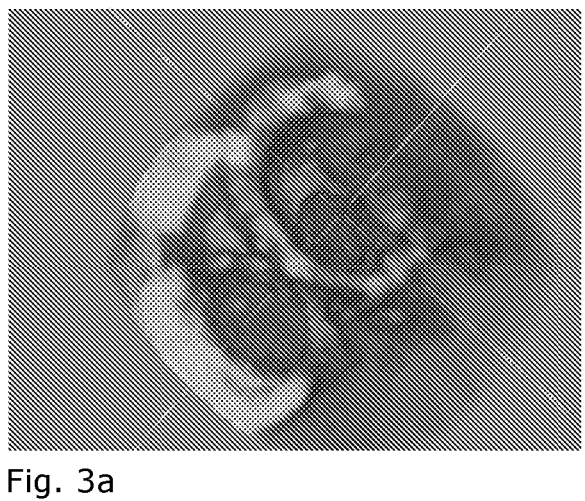
FIGS. 3a and 3b are images of an ultrasound scan showing a conventional image (FIG. 3a) and an image changes after an embodiment of the present invention is applied (FIG. 3b); and, FIG. 4 shows images in which the method of the present invention has been applied and in which the trade-off between colour distance λ parameter and Euclidean distance parameter with the steepness of the Gaussian kernel through θ is shown.

Embodiments of the present invention are directed to method and systems for displaying and applying user inputs to manipulate 3D imagery.

There exist many sources of 3D image data including 3D imaging scanners. Embodiments may receive data directly from a 3D image data source or may receive data that has been previously acquired and stored in a data repository or similar.

3D image data is typically encoded in the form of a 3D array of voxels. In 3D imaging, the term "voxel" is used to refer to a scalar or vector value on a regular grid in three-dimensional space. As with pixels in a bitmap, voxels themselves do not typically have their position (their spatial coordinates) explicitly encoded along with their values. Instead, rendering systems infer the position of a voxel based upon its position relative to other voxels (i.e., its position in the data structure that makes up a single volumetric image).

In embodiments of the present invention, the 3D image data is preferably processed (preferably in real time or near real time) so as to suppress image features that are in the periphery of the field of view. Preferably, the system decides on how/whether to portray image features in the rendered output in dependence on a distance dependent opacity map. In this way, image features at a focus point (designated by a user interface) are shown with full opacity, the image features around it are less visible as opacity decreases and the image features that are further away are increasingly suppressed. In one embodiment, the further features are from the immediate field of view, the more they are suppressed. It is important to note that the 3D image data is processed as the array of voxels (or other representation if voxels aren't used). As such, the existence of structures is not relevant to the system and no additional processing is needed. Opacity changes based on distance from the focus point and also on colour difference (or difference from the other scalar value if not colour). Vessels will likely have similar colours and so voxels of a vessel will have similar opacity depending on distance to viewpoint.

FIG. 1 is a schematic diagram of an imaging system according to an embodiment of the present invention.

The imaging system includes an image data source 10, a processor 20, a display 30, and a user interface. The user interface in this embodiment includes a position control 40 and a user input device 45 although it will be appreciated that different representations and input devices could be used.

The processor 20 receives image data from the image data source 10 and also position data from the position control 40. It generates an opacity channel from the position data and uses this to render the image data for display on the display 30.

In the illustrated embodiment, the position control is decoupled from the display 30. In some embodiments, the position control 40 may be superimposed over the displayed image on the display 30. In other embodiments it may be displayed separately.

A user (which may or may not be the operator of the imaging probe that generates the imaging data provided from the imaging data source 10) interacts with the position control 40 to define a highlighting position (base of the arrow (A)) and orientation (direction of the arrow). This is in this embodiment the data provided to the processor 20. Positioning could, for example be done using a mouse, tablet, X/Y/Z position and X/Y/Z highlight direction using a keyboard, sliders etc. In the illustrated example, the position cursor is illustrated by the arrow and is moved from position A to position B.

Once the positioning and kernel parameters have been established and the opacity channel $V_o$ calculated, the resulting 2 channel image is output for visualization through a transfer function, which maps intensity to colours, and the computed opacity channel to opacity.

Figure 3B:
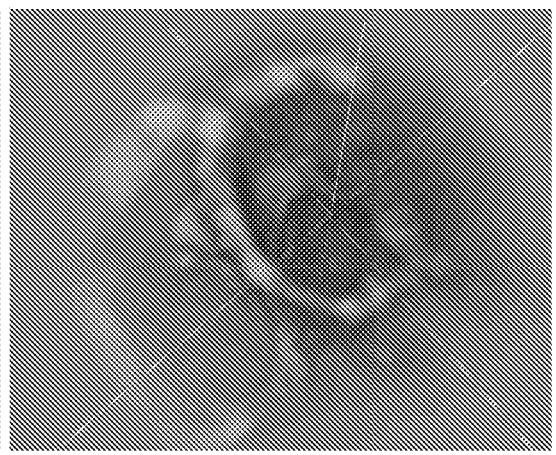

FIGS. 2a and 2b are illustrative line drawings and corresponding images showing a 3D rendered image without (FIG. 2a) and with (FIG. 2b) processing according to an embodiment of the present invention and FIGS. 3a and 3b are images of an ultrasound scan showing changes after an embodiment of the present invention is applied (FIG. 3a being an illustration of rendering without application of an embodiment of the present invention).

Given an intensity and an opacity channel, application of the transfer function by the processor 20 is straightforward. It will be appreciated that the output could be to a 3D display device, projection of the 3D image onto a 2D display or the output could be communication or storage of the rendered data (or the base 3D image data set and the opacity channel or just the opacity channel).

It will be appreciated that both the target position and the kernel parameters (θ, λ) can be tuned interactively. Preferably, the system includes a user interface in which the user can move a cursor to select the target point and can use slider or other GUI elements to select the kernel parameters.

The amount to which the surrounding regions are obscured can be controlled by trading-off parameters of the kernel (as discussed above, this is preferably provided to the user in the form of a GUI slider or the like). The trade-off in the above embodiment is between colour distance λ and Euclidean distance, and with the steepness of the opacity kernel through θ, as illustrated in FIG. 4.

FIG. 3a is an example of conventional rendering of ultrasound image data that is used in medical imaging for assisting the clinician in diagnosis or treatment decisions, for example. FIG. 3b is an image rendered using an embodiment of the present invention. In embodiments of the present invention, rendering is changed preferably in dependence on user inputs so that organs or other imaged structure that is at or around the focus of the highlight (cross-hair in FIG. 4) is rendered but as image features are encountered that are further away from the focus of highlight, these are suppressed relative to distance to the focus of highlight.

Preferably, the system includes a user interface that allows the user to interact in 3D with the rendered 2D environment. The user interface allows the user to pick a location in 3D (for example by hand tracking, or with an interaction tool) and make structures fade out as those structures get far from this point (see FIGS. 2b and 3b).

In this preferred embodiment, the 3D image data in the form of a scalar (1 channel) or vector (multi-channel) image is taken as input. The system computes an opacity channel based on a kernel which acts on the intensities and on the relative position of voxels in the 3D image data with respect to a user-defined location (typically the system will have a default location that can be manipulated by the user via a user interface). It will be appreciated that other formats of image data could also be used as inputs.

An opacity channel is calculated relative to the focus of the highlight, the opacity channel being used to generate the rendered view of FIG. 2b or 3b from the input image data. As can be seen from FIGS. 2b and 3b, the region of interest is opaque and visible through semi-transparent structures.

A 3D image is visualized using this transfer function, preferably using volume rendering that produces a 2D projection.

As will be appreciated, volume rendering refers to a set of techniques used to display a 2D projection of a 3D discretely sampled data set, typically a 3D scalar field. To render a 2D projection of the 3D image data set, one defines a camera in space relative to the volume, the opacity and also the colour of every voxel. This is usually defined using an RGBA (for red, green, blue, alpha) transfer function that defines the RGBA value for every possible voxel value.

For example, a volume may be viewed by extracting isosurfaces (surfaces of equal values) from the volume and rendering them as polygonal meshes or by rendering the volume directly as a block of data. The marching cubes algorithm is a common technique for extracting an isosurface from volume data. A ray casting algorithm is a common technique for rendering a volume directly.

Preferably the 3D image data set is stored as a D-dimensional scalar map with samples on a uniform grid G. This may be done as a translation step at the point that the 3D image data set is received or alternatively the data set could be stored as received and translated/mapped as an initial step when rendering is to be done.

Defining $V(X):R^D \to R$ as the D-dimensional scalar map with samples on a grid $G \subset R^D$ then $V(G)$ is a D-dimensional scalar image. Analogously, defining $V(X):R^D \to R$ as a vector valued map and $V(G)$ is a D-dimensional vector valued image. In the following, we denote all images V and assume a scalar image is a vector image where d=1.

To calculate the opacity channel, the user preferably provides:
1) a spatial position (preferably through a movable cursor) $P \in R^D$ and;
2) a M-dimensional parameter vector for a masking kernel θ (which can be provided through, for example, sliders or other control in a GUI).

In one embodiment, the masking kernel k maps the position X and the image V to a scalar opacity value, and is of the form:

$$K_{P,\theta}(\{X,V\}):R^{D+1} \to [0,1]$$

For example, the kernel may use an isotropic Gaussian kernel, centred at $P_0$:

$$k_{P,\theta}^{Gauss}(\{X, V\}) = \exp\left(-\frac{\|X - P\|^2}{\theta^2}\right)$$

where θ is a scalar value representing the width of the Gaussian kernel.

It will be appreciated from the above discussion that the kernel need not be of a Gaussian form. Other examples include a radial (spheroidal) step function and an inverse Gaussian Kernel:
i) Radial step function, centred at $P_0$:

$$k_{P,\theta}^{Spheroidal}(\{X, V\}) = \begin{cases} 1 & \text{if } \|X - P\|^2 < R^2 \\ 0 & \text{elsewhere} \end{cases}$$

where R is a scalar value representing the radius of the radial kernel.
ii) Inverse Gaussian kernel centred at $P_0$:(which would obscure the targeted region allowing other areas to be viewed):

$$k_{P,\theta}^{IGauss}(\{X, V\}) = 1 - \exp\left(-\frac{\|X - P\|^2}{\theta^2}\right)$$

where θ is a scalar value representing the width of the Gaussian.

Generalising the above approach for any kernel, preferred embodiments use a kernel that combines intensity (relative to a reference intensity value) and position (Euclidean distance to a target of interest) to define the opacity channel $V_o$ as follows:

$$V_o(X) = k_{P,\theta}^{proposed}(\{X,V\}) = (k_{P,\theta_1}^{position})^{(1-\lambda)}(k_{V_R,\theta_2}^{intensity})^\lambda$$

where λ is a trade-off factor between opacity being governed by intensity (λ=0) or opacity being governed by the position-based kernel (λ=1) $k_{P_0,\theta_1}^{position}$ is a position-based kernel, for example any of the kernels described above, and $k_{V_R,\theta_2}^{intensity}$ is an intensity-based kernel, for example:

$$k_{V_R,\theta_2}^{intensity} = \exp\left(-\frac{\|v - v_R\|^2}{\theta_2^2}\right)$$

As in the case above, VR is a reference image value (which can be the intensity at the target of interest, or fixed to typically VR=255 in a scalar ultrasound, i.e. the intensity of the bright white areas.

It will be appreciated that the parameters need not be user provided and could also be system defaults. Additionally, positioning and masking kernel parameters could be provided via an external system that may have recorded previous views of the dataset or has data from other sources (diagnostic, imaging, medical history or other data) and is guided by that data to highlight features that may be of interest. The system may also include machine learning or other systems so as to provide assistance on best choice of parameters for a particular feature that is at the focus of the field of view or highlight location (for example, within the crosshairs etc).

FIG. 4 shows example images of the opacity channel obtained using an embodiment of the present invention. The images show the opacity channel for increasing values of λ (from left to right: 0.1, 0.2, 0.3, 0.4 and 0.5) and of θ (from top to bottom: 0.05, 0.1 and 0.15), when picking a point on the atrium (white cross).

It will be appreciated that the above approach can be implemented in software and/or hardware. A recently exploited technique to accelerate traditional volume rendering algorithms such as ray-casting is the use of modern graphics cards. Starting with the programmable pixel shaders, people recognized the power of parallel operations on multiple pixels and began to perform general-purpose computing on (the) graphics processing units (GPGPU) and other high performance hardware. The pixel shaders are able to read and write randomly from video memory and perform some basic mathematical and logical calculations. These Single Instruction Multiple Data (SIMD) processors were used to perform general calculations such as rendering polygons and signal processing. In recent GPU generations, the pixel shaders now are able to function as Multiple Instruction Multiple Data (MIMD) processors (now able to independently branch) utilizing up to 1 GB of texture memory with floating point formats. With such power, virtually any algorithm with steps that can be performed in parallel, such as volume ray casting or tomographic reconstruction, can be performed with tremendous acceleration. The programmable pixel shaders can be used to simulate variations in the characteristics of lighting, shadow, reflection, emissive colour and so forth. Such simulations can be written using high level shading languages.

The foregoing preferred embodiments have been disclosed for the purpose of illustration. Variations and modifications of the basic concept of the invention will be readily apparent to persons skilled in the art. For example, graphical symbols other than dots or cross-hairs can be used to depict a position in the volume. Nor is the user interface limited to particular software elements. Not only could different software GUI elements be used, hardware interface features could also be used such as a track-ball, rocker switch, rotary switch, and keys. A mouse, a joystick, a lever, a slider or other input device could also be used, as could movement based detectors, virtual controllers/environments, augmented reality etc. It will also be appreciated that the rendered images produced could be used with many different display technologies including 2D, 3D, virtual reality, augmented reality, holographic and other display types. All such variations and modifications are intended to be encompassed by embodiments of the present invention.

It is to be appreciated that certain embodiments of the invention as discussed below may be incorporated as code (e.g., a software algorithm or program) residing in firmware and/or on computer useable medium having control logic for enabling execution on a computer system having a computer processor. Such a computer system typically includes memory storage configured to provide output from execution of the code which configures a processor in accordance with the execution. The code can be arranged as firmware or software, and can be organized as a set of modules such as discrete code modules, function calls, procedure calls or objects in an object-oriented programming environment. If implemented using modules, the code can comprise a single module or a plurality of modules that operate in cooperation with one another.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the present invention which is defined by the recitations in the claims and equivalents thereof.

This work is independent research funded by the National Institute for Health Research (Invention for Innovation programme, 3D Heart project, II-LA-0716-20001). The views expressed are those of the author(s) and not necessarily those of the NHS, the NIHR or the Department of Health.

This application claims priority from GB 1913832.0, the content of which and the content of the abstract accompanying this application are hereby incorporated by reference.

The invention claimed is:

1. A computer-implemented method for navigation and display of 3D image data, comprising:
    retrieving a 3D image dataset to be displayed;
    receiving identification of a highlight position within the 3D image dataset;
    calculating a scalar opacity map for the 3D image dataset, the scalar opacity map having a value for each of a plurality of positions in the 3D image dataset, the respective value being dependent on a respective distance from the highlight position, and on the value of the 3D image at the respective position relative to the value of the 3D image at the highlight position; and
    applying the opacity to the 3D image dataset to generate a modified 3D image view.

2. The method of claim 1, wherein the step of calculating uses a masking kernel.

3. The method of claim 2, wherein the masking kernel is selected from a set including a Gaussian kernel, a kernel based on a uniform/rectangular distribution, a radial basis function, a spherical step function or an exponential distribution.

4. The method of claim 3, further comprising receiving, via a user interface, the highlight position in the 3D image dataset, the method further comprising calculating the scalar opacity map in dependence on the highlight position, on the 3D image dataset and on the masking kernel.

5. The method of claim 4, further comprising receiving, via the user interface, parameters for the masking kernel.

6. The method of claim 5, wherein the user interface comprises a 2D representation of the 3D image dataset.

7. The method of claim 4, wherein the user interface comprises a 2D representation of the 3D image dataset.

8. The method of claim 1, wherein the step of calculating uses a predefined shape or a predefined 3D as a masking function.

9. The method of claim 1, further comprising rendering the modified 3D image as a 2D or 3D image for display to the user.

10. The method of claim 1, further comprising calculating the scalar opacity map for a region of the 3D image dataset, the region comprising the portion of the 3D image dataset between the highlight position and the edges of the 3D image dataset in a field of view.

11. A system for navigation and display of 3D image data, comprising:
   a data repository storing a 3D image dataset to be displayed;
   a user interface configured to receive identification of a highlight position within the 3D image dataset; and
   a processor configured to calculate a scalar opacity map for the 3D image dataset, the scalar opacity map having a value for each of a plurality of positions in the 3D image dataset, the respective value being dependent on a respective distance from the highlight position, and on the value of the 3D image at the respective position relative to the value of the 3D image at the highlight position and apply the opacity to the 3D image dataset to generate a modified 3D image view.

12. The system of claim 11, wherein the system is configured to receive, via the user interface, tuneable parameters for the masking kernel, the processor being configured to apply the received parameters when calculating the scalar opacity map.

13. The system of claim 12, wherein the user interface includes a 2D display showing a representation of the 3D image dataset, the system being configured to receive a designation of the highlight position via the 2D displayed representation.

* * * * *